United States Patent [19]

Matsumoto et al.

[11] Patent Number: 5,431,725
[45] Date of Patent: Jul. 11, 1995

[54] CASEIN MOLDED ARTICLE AND METHOD FOR PREPARING THE SAME

[75] Inventors: Kiyoichi Matsumoto, 1-86, Shimoueno Miyawaki, Ohyamazakicho, Otokuni-gun, Kyoto-fu; Hiroyuki Ueshima, 1-13, Shimodahigashi 4-chome, Kanba, both of Japan

[73] Assignees: Kiyoichi Matsumoto; Hiroyuki Uejima; Snow Brand Milk Products Co., Ltd., all of Hokkaido, Japan

[21] Appl. No.: 130,028

[22] Filed: Sep. 30, 1993

[30] Foreign Application Priority Data

Dec. 28, 1992 [JP] Japan .................. 4-359746

[51] Int. Cl.$^6$ ................... C09D 189/00; C08L 89/00
[52] U.S. Cl. ..................................... 106/138; 106/146
[58] Field of Search ................... 106/138, 146

[56] References Cited

U.S. PATENT DOCUMENTS

| | | |
|---|---|---|
| 2,512,674 | 6/1950 | Peterson . |
| 2,525,825 | 10/1950 | Peterson . |
| 2,548,357 | 4/1951 | Ferretti ......................... 162/101 |
| 3,310,446 | 3/1967 | Georgevits . |
| 3,346,408 | 10/1967 | Nakao et al. . |
| 3,619,316 | 5/1968 | Ishida et al. . |
| 3,695,902 | 10/1972 | Shank . |
| 3,806,611 | 4/1974 | Sawada et al. ................. 426/276 |
| 4,076,846 | 2/1978 | Nakatsuka et al. ............. 426/62 |
| 4,118,520 | 10/1978 | Visser et al. .................. 426/574 |
| 4,141,942 | 2/1979 | Maehara ........................ 264/9 |
| 4,197,323 | 4/1980 | Cerise et al. ................... 426/104 |
| 4,207,349 | 6/1980 | Visser et al. ................... 426/271 |
| 4,208,436 | 6/1980 | Visser et al. ................... 425/104 |
| 4,377,440 | 3/1983 | Gasland . |
| 4,563,360 | 1/1986 | Soucie et al. .................. 426/104 |
| 4,606,337 | 8/1986 | Zimmermann et al. ......... 128/156 |
| 5,089,307 | 2/1992 | Ninomiya et al. .............. 428/35.2 |

OTHER PUBLICATIONS

Avena-Bustillos, et al., "Water Vapor Permeability of Caseinate-Based Edible Films as Affected by pH, Calcium Crosslinking and Lipid Content", Abstract.**
G. Downey et al., "Texture Studies on Edible Protein Fibres Produced By a Wet Spinning Technique", *J. Fd Technol.*, 14:21-31 (1979).*
G. Downey, et al., "Texture Studies on Edible Protein Fibres Produced by a Wet Spinning Technique", *J. Fd Technol.*, 14:33-40 (1979).*

*Primary Examiner*—David Brunsman
*Attorney, Agent, or Firm*—Testa, Hurwitz & Thibeault

[57] ABSTRACT

Molded articles and method for manufacturing the same from modified casein are disclosed. The casein molded articles are obtained by molding, spinning or casting an aqueous solution of sub-micellular casein from which metal ions have been removed. Fibers, films and other articles made according to the present invention are biodegradeable and have excellent mechanical properties.

11 Claims, No Drawings

CASEIN MOLDED ARTICLE AND METHOD FOR PREPARING THE SAME

BACKGROUND OF THE INVENTION

Field of the Invention

The present invention relates to casein molded articles formed by molding, spinning, casting a film, or the like, and to a method for preparing the same. The casein molded articles of the present invention are useful as food materials, natural protein fibers or films, and the like.

Description of the Background Art

Industrial application of casein which is the major component of milk proteins, has been studied in many fields. Although some of these studies are actually practiced in industries, the amount of casein used in these applications is limited. The reason is that casein is difficult to be molded, because this protein easily forms a stable micelle structure due to its macromolecular surface activity.

Fibers have been manufactured from unmodified milk casein many years ago in Italy and sold under the trademark of LANITAL. This fiber was not favorably accepted because of its inferior mechanical characteristics and the manufacture was stopped. As the structure of casein protein was elucidated, the reasons for the poor mechanical properties were clarified.

Casein protein is a phosphoprotein possessing a macromolecular surface activity which causes the protein form a micelle structure. The micelle structure renders casein stable in milk. When separated from milk, casein will form globular micelles if an alkaline earth metal, such as calcium or magnesium, is present. Such globular micelles are difficult to disperse in a medium and difficult to mold.

There have been several proposals for dispersing casein, however, none brought about good results. For example, Japanese Patent Laid-open (kokai) No. 138145/1987 discloses a method of dissolving caseinate in an ethanol aqueous solution and making films by fluid spreading. However, caseinate becomes too hard when heated in a drying step, preventing it from being formed into fibers or films. This method therefore has not been industrially successful. Journal of Japan Agrichemical Society, 61, 1087-1092 (1987) proposes a method of dissolving or dispersing casein molecules by breaking down the micelle structure in a casein solution. The method involves treating the casein solution with a chelating resin, thereby removing the metals, e.g. calcium, from the casein solution. The report states that after the treatment, the casein molecules form sub-micelles, but does not describe how the sub-micelles can be used.

As mentioned above, the reason that the past trials of making fibers from milk casein have been unsuccessful lies in the molecular structure of the naturally occuring casein protein. Casein protein is a water-insoluble macromolecular surfactant consisting of hydrophobic protein and hydrophilic phosphoric acid groups. The phosphoric acid groups are bonded to counterions, i.e. metals such as calcium and magnesium, which induce the protein to form globular micelles. This configuration makes casein molecules difficult to orient in the longitudinal direction necessary to obtain an acceptable fiber. Obtaining fibers and other molded articles with acceptable mechanical properties from casein, therefore, has not been successful.

SUMMARY OF THE INVENTION

An object of the present invention is to provide casein molded articles, in particular fibers and films, having excellent mechanical properties.

Another object of the present invention is to provide a method for preparing casein molded articles from casein.

The above objects can be obtained according to the present invention and casein molded articles can be prepared by a method comprising providing an aqueous solution of casein which has been treated to remove substantially all of the metal ions thereby forming casein sub-micelles, and forming the molded article from this solution by molding, extruding or casting a film from this solution. The method is based on reducing natural casein's capability to form micelles to a level as low as possible. A preferred method of reducing the micelle-forming ability of casein is to remove substantially all of the metal ions from naturally-sourced casein.

Casein molded articles with excellent mechanical properties can be obtained by molding casein which has been modified to remove the metal ions and form sub-micelles. Casein modified in this manner may be used to form fibers, films, and the like, having excellent mechanical properties.

DETAILED DESCRIPTION OF THE INVENTION

The first step of the present method involves providing casein in sub-micellular form. Casein sub-micelles can be prepared, for example, by treating casein to remove substantially all the metal ions, such as calcium and magnesium, which are present in naturally-sourced casein. Casein from any source as prepared by conventional methods can be used as the raw material in the present invention without any specific limitations. Casein is the principal protein in milk, and exists in milk as a colloidal aggragate of protein together with phosphorus and calcium. Other metal ions, such as magnesium, also may be present. Casein useful in the present invention may be precipitated from milk, for example, by the addition of dilute acid or a coagulating enzyme. Casein which is commercially available in dried form also may be used.

In the first step of the present method, the casein is treated to remove calcium and any other metals which may be present. This may be accomplished by any method effective for selectively removing metal ions, such as, for example, ion-exchange or chelation. A preferred method of removing the metals comprises contacting an aqueous solution or dispersion of casein with a chelating agent. Any chelating agent may be used in the method, however resins having fixed chelating functional groups are preferred. Chelating resins having iminodiacetic acid groups as functional groups are most preferably used as the chelating resin. A method for removing metal ions from casein using a chelate-functional resin which is described in said report of Journal of Japan Agrichemical Society, supra. Preferably, the carboxyl terminals of the iminodiacetic acid groups in the resin comprise hydrogen ions ($H^+$). H-type resins are preferred because in order to ensure complete removal of metal ions from the casein, therefore the absence of alkali metals such as sodium at the functional group terminal is imperative. An iminodiacetic acid functional resin which is useful in the present invention, for example, is Uniselex ™ UR30 (trademark, manufactured by Unitica Co., Ltd.). This step is carried out by contacting an aqueous casein solution with the chelating resin under conditions appropriate to remove substantially all of the metal ions from the casein solution, thereby forming sub-micellular casein. Sub-micellular casein thus obtained may be dried by a conventional method, if desired.

The second step involves producing a molded article, fiber or film from an aqueous solution of the metal-free sub-micellular casein. Sub-micellular casein prepared as described above is dissolved in water to the desired concentration, and the resulting solution is subjected to a molding step, a spinning step, a film-making step, or the like for producing molded articles, fibers or films. Although there are no specific limitations as to the temperature at which the sub-micellular casein may be dissolved into water, a temperature of less than about 50° C. is preferred. A useful temperature range is about 10–50° C., and preferably about 20–40° C. The concentration of casein solution varies depending on the temperature. The preferred concentration range of the sub-micellular casein solution is about 17–25%, with the range of about 18–24% being most preferred.

Water used for preparing casein solutions used in the present invention must be free of metal ions. Distilled water, ion-exchanged water or water obtained by distillation of ion-exchanged water is most preferred.

The solution of sub-micellular casein thus prepared exhibits excellent molding, spinning, and film-forming capability. Sub-micellular, metal-free casein prepared as described herein can be formed into a fiber or film by spinning or extruding it from pores or slits at about 10–40° C., for example. Without wishing to be bound by theory, it is believed that the sub-micellular casein obtained by the above-mentioned treatment and dissolved in water is substantially devoid of metals which act as nuclei for micelles, therefore it forms micelles very slowly, ensuring that the casein molecules are present in water in a well-dispersed state. Based upon the viscosity behavior of the solution, it is believed that the sub-micellular casein molecules form liquid crystals in solution. This liquid crystal form enables the casein to be molded as described.

The sub-micellular casein solution in which casein is dissolved in this manner exhibits superior molding, spinning and film-forming capability. Sub-micellular, metal-free casein can be easily molded into fibers or films. Casein molecules in this configuration are oriented in the longitudinal direction of fiber, so that fibers, films, and the like having excellent mechanical properties are obtained by spinning or extruding the solution of sub-micellular casein. Spinning or extruding of the sub-micellular casein solution into air is a particularly preferred method. The cross-sectional shape of orifices useful for spinning the sub-micellular casein solution may be circular, polygonal (including triangle, rectangle, starlike shape), linear, or the like, but are not limited to these.

There are no specific limitations to the speed at which the casein aqueous solution may be spun or extruded. The winding speed of the solidified molded product can be appropriately determined according to the viscosity of the solution, the injection speed of the solution, the temperature of the medium into which the solution is injected, and other conditions.

Molded products, fibers or films obtained by the method of the present invention may be further drawn in order to promote their mechanical properties.

According to the present invention casein, which has been heretofore difficult to form into molded articles such as fibers, films, or the like, can be easily molded and manufactured into regeneration fibers, films, and other articles made of natural casein proteins. These fibers and films have the chemical structure of casein proteins, which is essentially the same as silk, therefore their properties are closer to those of natural fibers than can be obtained using conventional synthetic fibers, such as acrylics. Casein fibers can be woven into cloth or sheets which are useful for various applications. In addition, because the raw material (casein) is naturally found in milk, articles made according to the invention that may be used as food materials, such as edible fibers. Casein is a naturally occurring material which is biodegradable, therefore, articles mase from casein fibers or films contribute to global environment conservation. Casein films or woven fibers, for example, could be used to make biodegradeable packaging materials.

Other features of the invention will become apparent in the course of the following description of the exemplary embodiments, which are given for illustration of the invention, and are not intended to be limiting.

EXAMPLES

Example 1

(1) Treatment of casein

An aqueous solution of casein micelles obtained by dissolving casein in water was passed through a layer of Uniselex ™ UR30 (trademark, manufactured by Unitica Co., Ltd.) to remove calcium. The resulting solution containing sub-micellular casein was dried.

(2) Preparation of an aqueous solution of sub-micellular casein

The sub-micellular casein obtained in step (1) above was dissolved into metal-ion free water at various concentrations to prepare aqueous solutions of sub-micellular casein. These aqueous solutions were injected from an injection needle with a pore diameter of 0.5 mm to form a fiber. The resulting fiber was wound around a glass rod at a winding speed of 10 m/minute. The casein fibers were tested for mechanical properties, such as tensile strength and flexibility. These properties are indicated by the processability of the fiber, i.e., its spinnability and winding properties. The test results showing the processability of casein fibers processed from solutions of varying casein concentrations which were processed at various temperatures are given in Tables 1-1 and 1-2. The spinning test results are indicated by numbers according to the following criteria:

1: Fiber was broken at once (the material was not spinnable).
2: Fiber could not be wound.
3: Fiber was partly windable.
4: Fiber could be wound.
5: Fiber could be wound excellently.

TABLE 1-1

| Casein concentration (%) | Ambient temperature (°C.) | Spinning test results |
|---|---|---|
| 10 | 5 | 1 |
|  | 10 | 1 |
|  | 20 | 1 |
|  | 30 | 1 |
|  | 35 | 1 |
|  | 40 | 1 |

TABLE 1-1-continued

| Casein concentration (%) | Ambient temperature (°C.) | Spinning test results |
| --- | --- | --- |
| 15 | 5 | 2 |
|    | 10 | 2 |
|    | 20 | 2 |
|    | 40 | 2 |
|    | 35 | 2 |
|    | 40 | 2 |
| 17 | 5 | 2 |
|    | 10 | 3 |
|    | 20 | 3 |
|    | 25 | 3 |
|    | 30 | 3 |
|    | 35 | 3 |
|    | 40 | 3 |
| 18 | 5 | 2 |
|    | 10 | 3 |
|    | 20 | 4 |
|    | 30 | 4 |
|    | 35 | 3 |
|    | 40 | 3 |

TABLE 1-2

| Casein concentration (%) | Ambient temperature (°C.) | Spinning test results |
| --- | --- | --- |
| 20 | 5 | 3 |
|    | 10 | 4 |
|    | 20 | 5 |
|    | 25 | 5 |
|    | 30 | 5 |
|    | 35 | 3 |
|    | 40 | 3 |
| 22 | 5 | 2 |
|    | 10 | 4 |
|    | 15 | 5 |
|    | 20 | 5 |
|    | 25 | 5 |
|    | 30 | 5 |
|    | 35 | 4 |
|    | 40 | 3 |
| 23 | 5 | 2 |
|    | 10 | 3 |
|    | 20 | 4 |
|    | 25 | 4 |
|    | 30 | 4 |
| 24 | 5 | 3 |
|    | 10 | 3 |
|    | 20 | 4 |
|    | 25 | 4 |
|    | 30 | 3 |
|    | 35 | 3 |
|    | 40 | 3 |
| 25 | 5 | 3 |
|    | 10 | 3 |
|    | 20 | 3 |
|    | 25 | 3 |
|    | 30 | 3 |
|    | 35 | 3 |
| 26 | 5 | 2 |
|    | 10 | 2 |
|    | 20 | 2 |
|    | 25 | 2 |
|    | 30 | 2 |
|    | 40 | 2 |

Spinning test results of 3 or greater indicate that the casein fiber is useable and the object of the present invention has been achieved.

Numerous modifications and variations of the present invention are possible in light of the above teachings. It is therefore to be understood that within the scope of the appended claims, the invention may be practiced otherwise than as specifically described herein.

What is claimed is:

1. A method for producing molded articles from casein comprising:
   a. providing an aqueous solution of metal-free sub-micellular casein; and
   b. extruding or casting said solution under conditions sufficient to form said article.

2. The method of claim 1 wherein said molded article comprises a casein fiber.

3. The method of claim 1 wherein the metal-free sub-micellular casein is formed by contacting casein with an agent which selectively removes metal ions, said agent comprising an iminodiacetic acid-functional resin.

4. The method of claim 1 wherein the solution of metal-free sub-micellular casein has a concentration of from about 17% by weight to about 25% by weight.

5. The method of claim 1 wherein step (b) is carried out at a temperature in the range of from about 10° C. to about 50° C.

6. The method of claim 1 wherein the solution of step (a) has a concentration from about 17% by weight to about 25% by weight, and step (b) is carried out at a temperature in the range of from about 10° C. to about 50° C.

7. The method of claim 1 wherein the solution of metal-free sub-micellular casein has a concentration of from about 18% by weight to about 22% by weight.

8. The method of claim 1 wherein step (b) is carried out at a temperature in the range of from about 20° C. to about 40° C.

9. The method of claim 1 wherein the solution of step (a) has a concentration from about 18% by weight to about 22% by weight, and step (b) is carried out at a temperature in the range of from about 20° C. to about 40° C.

10. A molded article comprising metal-free casein.

11. A fiber-comprising metal-free casein.

* * * * *

UNITED STATES PATENT AND TRADEMARK OFFICE
CERTIFICATE OF CORRECTION

PATENT NO. : 5,431,725
DATED : July 11, 1995
INVENTOR(S) : Kiyoichi Matsumoto and Hiroyuki Uejima It is certified that error appears in the above-indentified patent and that said Letters Patent is hereby corrected as shown below:

On the title page, item

[75] Inventors . . . "Ueshima" should be ---Uejima---
. . . "Kanba" should be ---Kashiba---

Signed and Sealed this

Twelfth Day of December, 1995

Attest:

BRUCE LEHMAN

*Attesting Officer*     *Commissioner of Patents and Trademarks*